(12) United States Patent
Sopko et al.

(10) Patent No.: US 7,298,102 B2
(45) Date of Patent: Nov. 20, 2007

(54) ELECTRIC DRIVE SYSTEM HAVING DC BUS VOLTAGE CONTROL

(75) Inventors: Tom Sopko, East Peoria, IL (US); Brian Kuras, Metamor, IL (US); Mustafa Guven, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 355 days.

(21) Appl. No.: 10/977,293

(22) Filed: Oct. 29, 2004

(65) Prior Publication Data

US 2005/0263331 A1 Dec. 1, 2005

Related U.S. Application Data

(63) Continuation-in-part of application No. 10/852,137, filed on May 25, 2004.

(51) Int. Cl.
*H02P 5/00* (2006.01)
*B60K 6/00* (2006.01)

(52) U.S. Cl. .................... 318/139; 318/138; 318/140; 320/104

(58) Field of Classification Search ........ 318/140–149, 318/139, 439; 320/104, 149, 150; 123/179.3; 180/65.1
See application file for complete search history.

(56) References Cited

U.S. PATENT DOCUMENTS

| | | | |
|---|---|---|---|
| 6,175,217 B1 * | 1/2001 | Da Ponte et al. | 322/19 |
| 6,323,608 B1 * | 11/2001 | Ozawa | 318/139 |
| 6,388,421 B2 * | 5/2002 | Abe | 320/104 |
| 6,487,096 B1 | 11/2002 | Gilbreth et al. | |
| 6,583,519 B2 | 6/2003 | Aberle et al. | |
| 6,630,810 B2 * | 10/2003 | Takemasa et al. | 320/104 |
| 6,639,328 B2 | 10/2003 | Wacknov | |
| 6,737,762 B2 * | 5/2004 | Koenig | 307/48 |
| 6,841,972 B2 * | 1/2005 | Koo | 320/132 |
| 6,923,279 B2 * | 8/2005 | Shimane et al. | 180/65.1 |
| 6,962,135 B2 * | 11/2005 | Kahlon et al. | 123/179.3 |
| 2002/0140405 A1 * | 10/2002 | Malik | 320/166 |
| 2002/0158513 A1 * | 10/2002 | Amano et al. | 307/10.6 |
| 2003/0015873 A1 | 1/2003 | Khalizadeh et al. | |
| 2003/0080622 A1 | 5/2003 | Koenig | |
| 2003/0111842 A1 | 6/2003 | Gilbreth et al. | |
| 2003/0117113 A1 * | 6/2003 | Takemasa et al. | 320/150 |
| 2004/0119441 A1 * | 6/2004 | Koo | 320/104 |
| 2004/0212351 A1 * | 10/2004 | Kneifel et al. | 320/149 |

(Continued)

OTHER PUBLICATIONS

Solectria Corporation, Ultracapacitor Controller and Fuel Cell Controller, Feb. 2004, pp. 1-2, Woburn, MA.

*Primary Examiner*—Paul Ip
(74) *Attorney, Agent, or Firm*—Liell & McNeil

(57) ABSTRACT

An electric drive system has a power source and a generator operatively connected to the power source. The electric drive system also has at least one energy storage device such as a capacitor configured to store a supply of power. The electric drive system further has a common bus configured to direct the power output to the capacitor. The electric drive system also has at least one motor configured to receive power from the common bus. A controller for the electric drive system is provided, having an article therewith having a computer readable medium with a control algorithm recorded thereon. The control algorithm includes means for compensating for a change in power demand on a DC bus of the electric drive system.

19 Claims, 5 Drawing Sheets

U.S. PATENT DOCUMENTS

2005/0048335 A1* 3/2005 Fields et al. .................. 429/22
2005/0061561 A1* 3/2005 Leonardi et al. ........... 180/65.1
2005/0067999 A1* 3/2005 Okamura et al. ........... 318/800
2005/0068003 A1* 3/2005 Gauthier et al. ............ 320/104

* cited by examiner

ELECTRIC DRIVE SYSTEM HAVING DC BUS VOLTAGE CONTROL

CROSS-REFERENCE TO RELATED APPLICATIONS

The present application is a Continuation-in-Part of U.S. patent application Ser. No. 10/852,137, filed May 25, 2004.

TECHNICAL FIELD

The present disclosure relates generally to a control system and method for an electric drive system in a work machine and, relates more particularly to a control system utilizing an algorithm and method for compensating for changes in power demand in an electric drive system having DC bus voltage control.

BACKGROUND

Work machines such as, for example, wheel loaders, track type tractors, and other types of heavy machinery are used for a variety of tasks. These work machines include a power source, which may be, for example, an engine such as a diesel engine, a gasoline engine, or a natural gas engine, that provides the power required to complete these tasks. To efficiently perform these tasks, the power source may be coupled to a generator to produce an electrical power output supplied to one or more electric motors. The motors may be connected to ground engaging devices to propel the work machine.

Typically, the generator is commanded to produce power when a voltage level of an energy storage device disposed between the generator and the motor drops below a predetermined level and to stop producing power when the voltage level of the energy storage device exceeds a predetermined level. For example, U.S. Pat. No. 6,333,620 (the '620 patent) issued to Schmitz et al. on Dec. 25, 2001 describes a series type hybrid vehicle having a power source, a generator, a battery array, at least one electric motor, and a controller. The controller is configured to maintain a state of charge of the battery array within a control limit. The controller compares a state of charge of the battery array to an upper control limit and decreases generator output if the state of charge is equal to or greater than the associated upper control limit. The controller is further configured to increase generator output if the state of charge is less than the upper control limit.

Although the controller of the '620 patent may maintain a sufficiently constant state of charge of the battery array, the controller may require complex and expensive components necessary to respond quickly to power demand fluctuations. In addition, the battery array may provide insufficient acceleration and regenerative braking capacity.

Related problems are associated with other known systems, including challenges in effectively partitioning power draw and supply among the various system components of an electric drive.

The present disclosure is directed to overcoming one or more of the problems set forth above.

SUMMARY OF THE DISCLOSURE

In one aspect, the present disclosure provides an article having a computer readable medium with a control algorithm recorded thereon. The control algorithm includes means for compensating for a change in power demand on a DC bus, which has an electric motor and a generator connected therewith. The means for compensating includes, means for commanding a current change at a DC to DC converter coupling an energy storage device with the DC bus. The means for compensating functions such that the change in power demand is primarily compensated for by the energy storage device rather than the generator, if the stored energy of the energy storage device is within a predetermined middle range.

In another aspect, the present disclosure provides a method of controlling a power supply to a DC bus in an electric drive system, wherein the electric drive system includes a generator and a motor coupled with the DC bus. The method includes the step of compensating for a change in power demand on the DC bus, at least in part with an energy storage device by commanding a current change at a DC to DC converter coupling the energy storage device with the DC bus, if a stored energy of the energy storage device is within a predetermined middle range.

DETAILED DESCRIPTION

Figure 1:
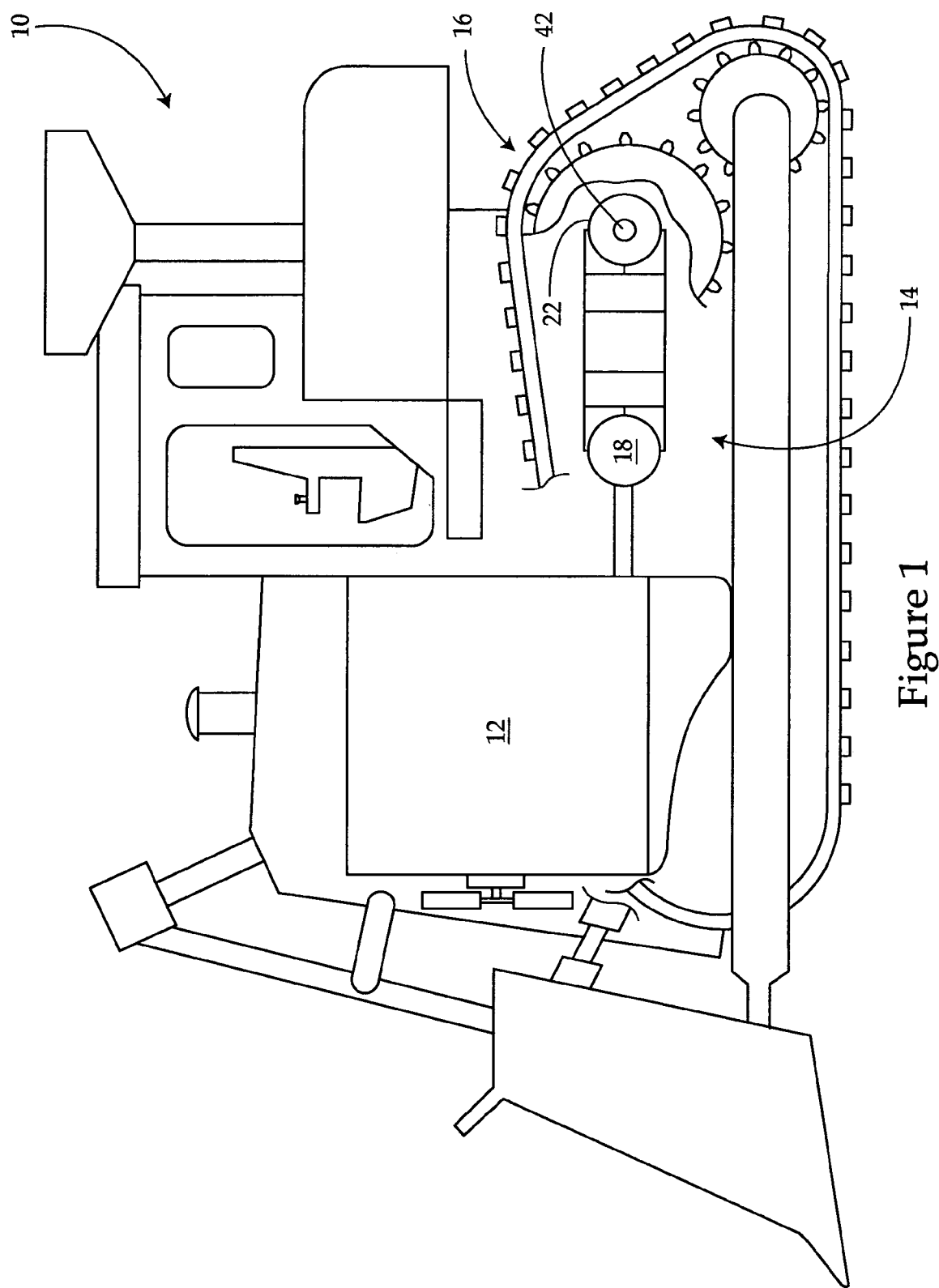
FIG. 1 is a diagrammatic illustration of a work machine according to an exemplary disclosed embodiment.

FIG. 1 illustrates a work machine 10 having a power source 12 and an electric drive 14 connected to a traction device 16. Work machine 10 may be a mobile machine that performs some type of operation associated with an industry such as mining, construction, farming, transportation, or any other industry known in the art. For example, work machine 10 may be an earth moving machine, a marine vessel, an aircraft, an on-highway passenger vehicle, or any other suitable mobile work machine.

Power source 12 may be an engine, such as a diesel engine, a gasoline engine, a natural gas engine, or another appropriate engine. It is contemplated that electric drive 14 may be used with another type of power source such as, for example, a fuel cell. Power source 12 may have a maximum rotational speed limit.

Figure 2:
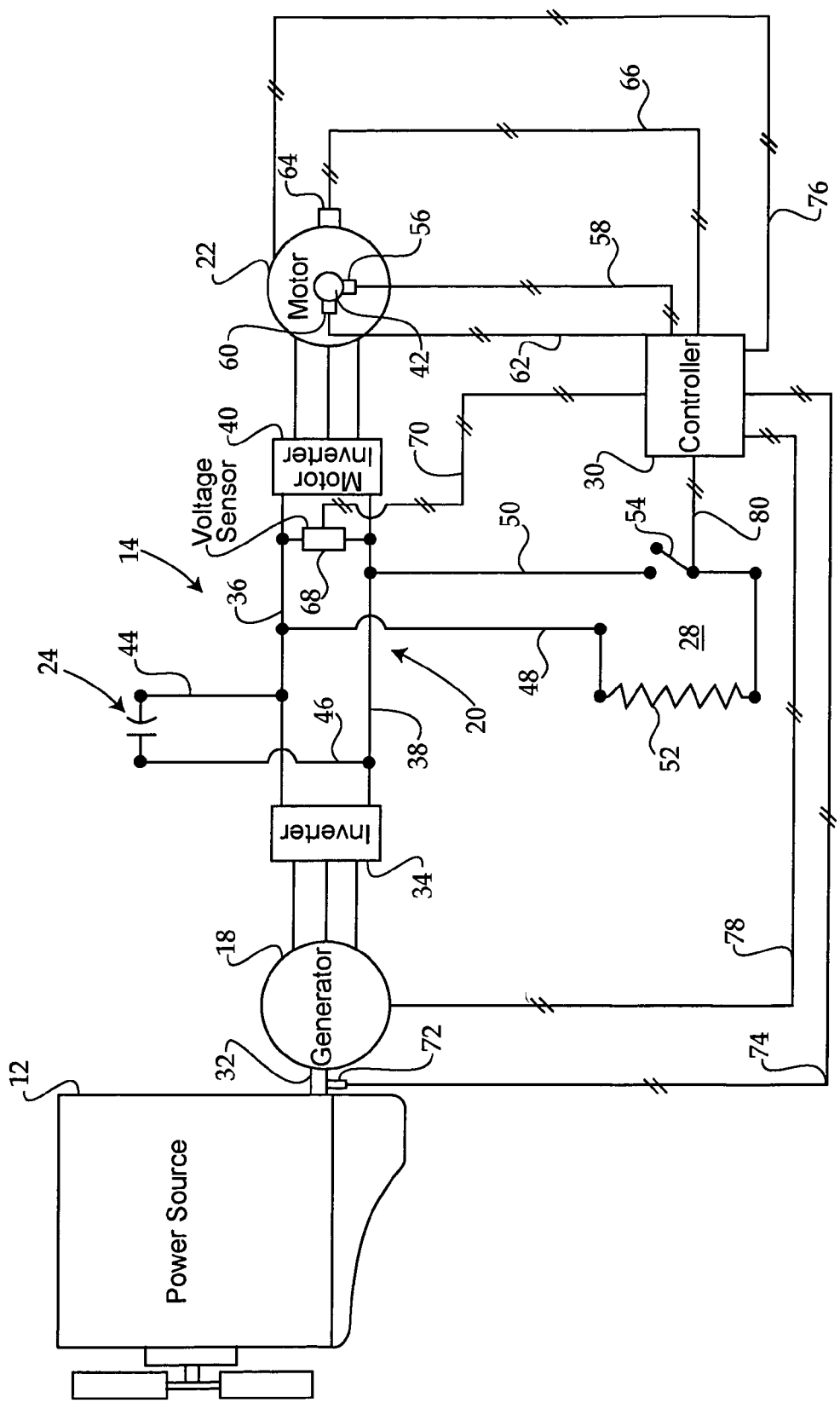
FIG. 2 is a schematic illustration of an electric drive system.

As illustrated in FIG. 2, electric drive 14 may include a generator 18 configured to produce an output power directed to a common bus 20 shared with a motor 22, an energy storage device 24, and a resistive grid circuit 28. Energy storage device 24 is preferably a capacitor, for example, of a type known in the art as a "supercapacitor" or an "ultracapacitor," however, other energy storage devices such as batteries may be substituted without departing from the scope of the present disclosure. Thus, as used herein the term capacitor should not be taken as limiting. Electric drive 14 may also include a controller 30 in communication with motor 22, generator 18, resistive grid circuit 28, and common bus 20.

Generator 18 may be a three-phase permanent magnet alternating field-type generator configured to produce a power output in response to a rotational input from power source 12. It is also contemplated that generator 18 may be a switched reluctance generator, a direct phase generator, or any other appropriate type of generator known in the art. Generator 18 may include a rotor (not shown) rotatably connected to power source 12 by any means known in the art such as, for example, by a direct crankshaft connection 32, via a gear train, through a hydraulic circuit, or in any other appropriate manner. Generator 18 may be configured to produce electrical power output as the rotor is rotated within a stator (not shown) by power source 12. Generator 18 may be connected to common bus 20 via a generator inverter 34, which may be configured to invert the alternating current to direct current. It is contemplated that controlled 30 may be in communication with generator inverter 34.

Common bus 20 may include positive and negative power lines 36, 38 that electrically connect generator inverter 34, capacitor 24, resistive grid circuit 28, and a motor inverter 40 connected to motor 22. Common bus 20 may also be electrically connected to additional power storage devices (not shown) and accessory power loads (not shown) to provide and/or to remove power from common bus 20. It is contemplated that controller 30 may be in communication with motor inverter 40.

Motor 22 may be a permanent magnet alternating field-type motor configured to receive power from common bus 20 and to cause movement of traction device 16. It is also contemplated that motor 22 may be a switched electric motor, a direct phase motor, or any other appropriate type of motor known in the art. Motor 22 may be connected to traction device 16 with a direct shaft coupling 42, a gear mechanism, or in any other manner known in the art.

Capacitor 24 may be connected to common bus 20 via positive and negative power lines 44, 46 and may have a desired voltage range. It is contemplated that any number of capacitors 24 may be included in electric drive 14 according to the requirements of a particular application. For the purposes of this disclosure, the desired voltage range may be defined as that voltage range recommended by the supplier of capacitor 24 for safe operation and may include an upper limit and a lower limit. It is also contemplated that the desired voltage range may be defined by motor and generator inverter power electronic limitations. The selection of a particular voltage range capacitor 24 implemented within electric drive 14 may be dependent upon the intended application. For example, electric drive 14 intended for operation in a small lightweight passenger vehicle may include capacitor 24 having a desired voltage range of approximately 300–600 volts. Electric drive 14 intended for operation in a larger mining truck application may include capacitor 24 having a desired voltage range of approximately 1500 to 2500 volts.

Capacitor 24 may be configured to draw power from common bus 20 and store this power for later release when motor 22 or other accessory loads draw power from common bus 20. During operation of electric drive 14, generator 18 may be capable of producing power in excess of a requested motor power. If a voltage level of common bus 20 is below an upper voltage limit of a desired voltage range and generator 18 has excess power output, capacitor 24 may be charged until the upper voltage limit is reached. If, however, generator 18 does not have the capacity to supply the power demanded by motor 22 or other accessory loads, capacitor 24 may discharge the power stored within capacitor 24 to common bus 20.

Excess power may also be directed to common bus 20 by motor 22 during regenerative braking. Whenever brakes are applied to work machine 10 to slow work machine 10, energy is removed from work machine 10. The faster work machine 10 is traveling, the more energy it has. The brakes of work machine 10 can capture some of this energy by using regenerative braking. That is, instead of just using the brakes to stop work machine 10, motor 22 may also slow the work machine by acting as a generator while work machine 10 is slowing down. The power generated by motor 22 may be directed to common bus 20 where it may be absorbed by capacitor 24. Power not absorbed by capacitor 24 during regenerative braking may be directed to generator 18. Generator 18 may then be caused to motor power source 12, thereby using operational friction of power source 12 to dissipate the excess power.

Resistive grid circuit 28 may be connected to common bus 20 via positive and negative power lines 48, 50 and configured to dissipate excess power from common bus 20. Resistive grid circuit 28 may have a resistive element 52 and a switch 54. It is contemplated that resistive grid circuit 28 may include a greater number of resistive elements 52 and/or that a greater number of resistive grid circuits 28 may be included in electric drive 14. Switch 54 may be caused to move from an open position to a closed position causing respective open and closed conditions of resistive grid circuit 28. When in the open condition, resistive grid 28 draws no power from common bus 20. When in the closed condition, however, power may be dissipated from common bus 20 by resistive element 52.

Controller 30 may be configured to trigger the closed condition. As described above, excess power (power not absorbed by capacitor 24) regenerated during braking may be dissipated through frictional losses of power source 12 as generator 18 motors power source 12. However, if the excess power is above a predetermined level, power source 12 may exceed the maximum rotational speed limit when attempting to dissipate the excess power. In order to prevent overspeeding of power source 12, resistive grid circuit 28 may be changed to the closed condition to remove power from common bus 20. Controller 30 may trigger the closed condition as power source 12 nears the maximum rotational speed limit.

Controller 30 may be configured to receive inputs indicative of a requested motor power. These inputs may include a motor speed, a motor torque, a motor torque command, a motor voltage and current level, a DC bus voltage level, and/or a generator speed. For example, an actual motor speed may be received via a communication line 58 from a motor speed sensor 56 disposed on shaft coupling 42. An output motor torque may be received via a communication line 62 from a torque sensor 60 disposed on shaft coupling 42. A motor voltage and current level may be received via a communication line 66 from a voltage and current sensor 64 connected to motor 22. It is also contemplated that voltage and current sensor 64 may be embodied in separate sensors configured to sense the separate power characteristics supplied to motor 22. A DC bus voltage level may be received via a communication line 70 from a voltage sensor 68 connected to common bus 20. An actual generator rotational speed may be received via a communication line 74 from a generator speed sensor 72 disposed on crankshaft connection 32.

Controller 30 may also be in communication with motor 22, generator 18, and/or resistive grid circuit 28 via communication lines 76, 78, and 80, respectively. As previously noted, controller 30 may also be in communication with generator inverter 34 and motor inverter 40. Controller 30 may be in communication with motor 22 (or motor inverter 40) to monitor inputs to motor 22 indicative of a command speed or a command torque communicated to motor 22. Controller 30 may be in communication with generator 18 (or generator inverter 34) to send generator torque commands to generator 18. Controller 30 may further be in communication with resistive grid circuit 28 to change resistive grid circuit 28 from the open condition to the closed condition and vice versa.

Controller 30 may be embodied in a single microprocessor or multiple microprocessors. Numerous commercially available microprocessors can be adapted to perform the functions of controller 30. It should be appreciated that controller 30 could readily be embodied in a general work machine microprocessor capable of controlling numerous work machine functions.

Controller 30 may include any means for storing and comparing information and controlling an operating parameter of work machine 10 such as a memory, one or more data storage devices, or any other components that may be used to run an application. Furthermore, although aspects of the present disclosure may be generally described as being stored in memory, one skilled in the art will appreciate that these aspects can be stored on or read from types of computer-related products or computer-readable media such as computer chips and secondary storage devices, including hard disks, floppy disks, optical media, CD-ROM, or other forms of RAM or ROM. Various other known circuits may be associated with controller 30, including power supply circuitry, signal-conditioning circuitry, solenoid driver circuitry, communication circuitry, and other appropriate circuitry.

Controller 30 may be configured to change operation of generator 18 in response to the requested generator power. Operational changes of generator 18 may include, for example, entering a positive power producing condition, entering a negative power producing condition (motoring of power source 12), a rate change of positive or negative power production, and/or entering an idle condition.

Controller 30 may include a table of efficiency offset values stored in the memory of controller 30. As will be described in more detail in the following section, these offset values may relate motor characteristics such as, for example, speed and/or temperature to motor efficiency and may be applied to a sum of a requested motor and bus power to determine a requested generator power that will accommodate the requested motor and bus power. These offset values may be determined for each individual motor 22 during a calibration stage of a manufacturing process.

Traction device 16 connected to motor 22 may include any means for propelling work machine 10 such as, for example, belts, tracks, tires, or any other means known in the art. It is contemplated that one or more traction devices 16 on a first side of work machine 10 may be driven independent of one or more traction devices 16 on a second side of work machine 10 (only one side shown), opposite the first.

Figure 3:
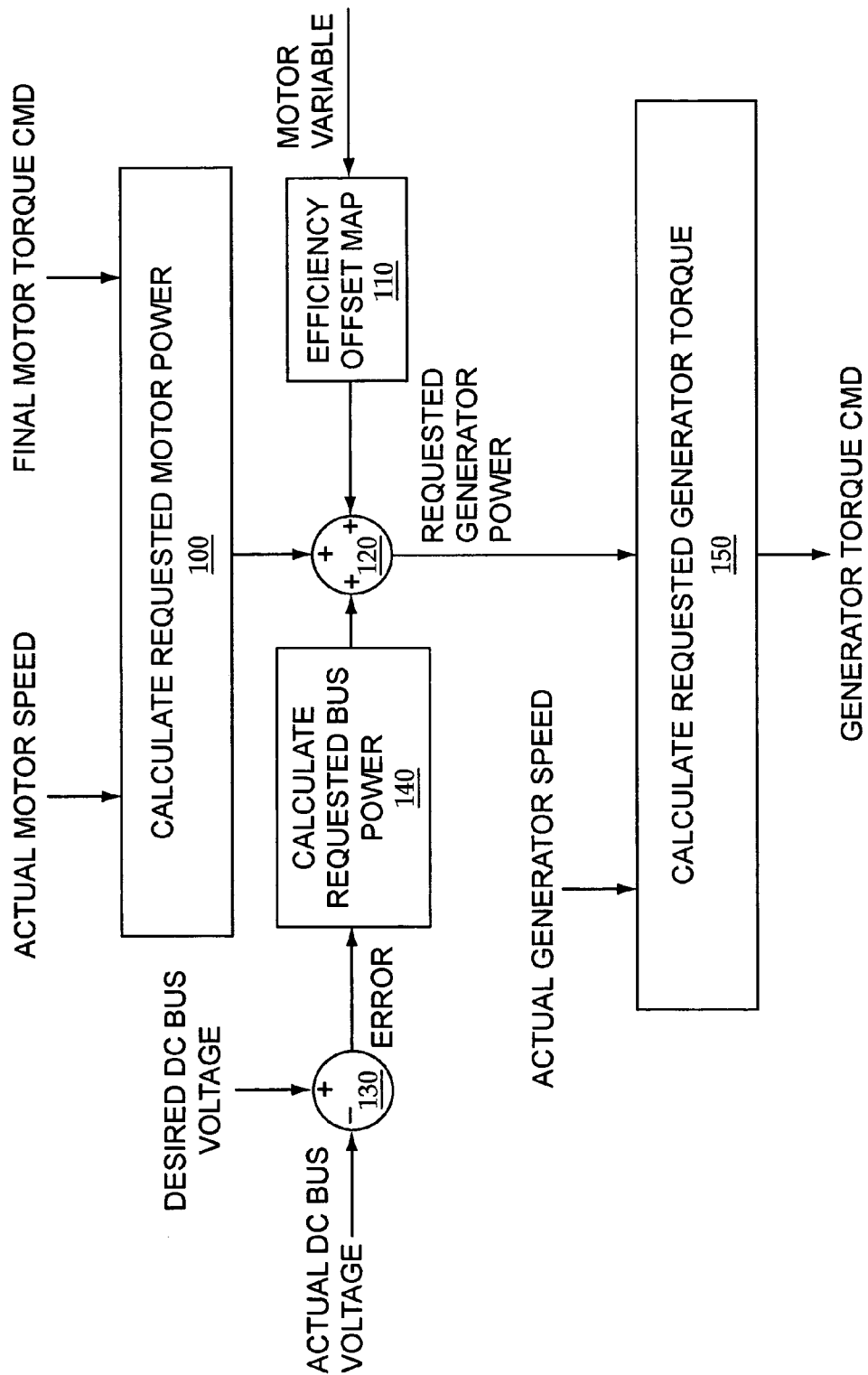
FIG. 3 is process chart showing operation of an electric drive system according to an exemplary disclosed embodiment.

FIG. 3 illustrates an exemplary process chart for electric drive 14 and will be described in more detail in the following section.

Figure 4:
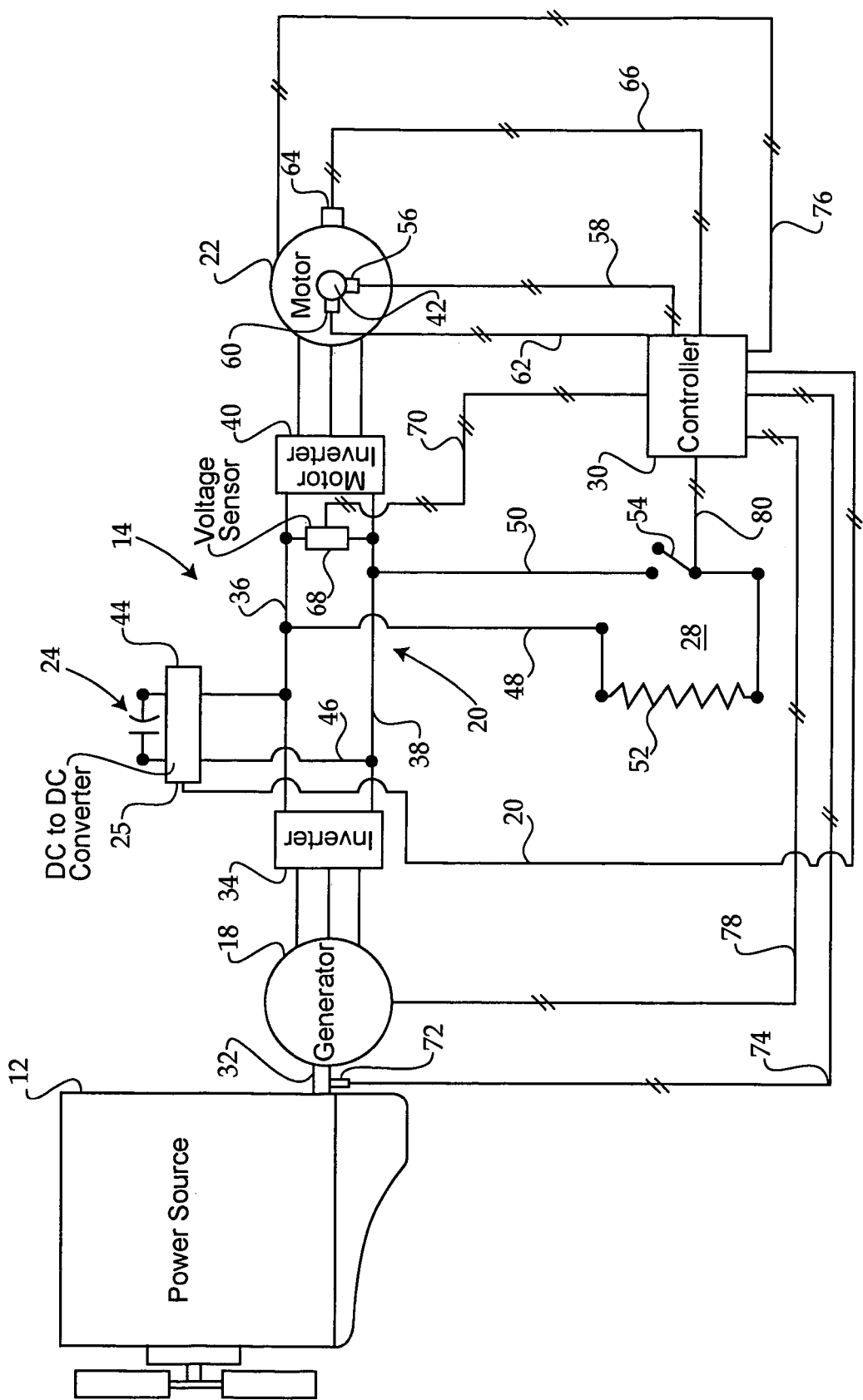
FIG. 4 is a schematic illustration of an electric drive system according to an exemplary disclosed embodiment.

FIG. 4 illustrates another exemplary embodiment of the present disclosure, wherein like numerals are used to identify features alike to those described with regard to FIG. 2. FIG. 4 illustrates an embodiment similar to the foregoing, however, the FIG. 4 embodiment differs primarily in that a DC to DC converter 25 is disposed between energy storage device 24, e.g. a capacitor, and the other components of the system. Those skilled in the art will appreciate that DC to DC converter 25 may be any suitable DC to DC converter known in the art, and is preferably a bi-directional DC to DC converter operably coupled with controller 30 via a communication line 31. Accordingly, controller 30 is preferably operable to command a current change at DC to DC converter 25, such that current may flow from capacitor 24 at a selected voltage into or out of common bus 20. By effectively isolating a voltage swing of capacitor 24, DC to DC converter 25 allows the quantity of energy stored in capacitor 24 to be maximized. In other words, because the quantity of energy stored in a capacitor is proportional to the voltage, DC to DC converter 25 allows the voltage swing of capacitor 24 to be independent of common bus 20, which may be preferably maintained at a constant voltage.

INDUSTRIAL APPLICABILITY

The disclosed electric drive may be applicable to any mobile work machine. Based on measured speed, command speed, measured torque, command torque, motor voltage, and/or motor current information, the disclosed electric drive system may operate to minimize overall system cost and to reduce response time associated with a change in motor loading. A change in a motor loading, under normal circumstances, might cause a common bus voltage to drop below or rise above a desired voltage range. The deviation from the desired voltage range may result in power loss, loss of responsiveness, electric drive instability, and possibly damage to power electronics associated with the electric drive system. Rather than waiting for the common bus voltage to drop below a predetermined level during a change in motor loading, sending a requested torque command from the motor directly to the capacitor and/or generator simultaneous with the change, may act to smooth power fluctuations, maintain a desired voltage level of common bus 20, improve responsiveness and stability of the electric drive system, and protect the power electronics of the electric drive. Operation of electric drive 14 will now be described in detail with reference to FIG. 3.

The process of determining a generator torque request may be initiated by determining a requested motor power associated with a change in motor loading. Requested motor power is the power required to maintain an operator desired work machine travel speed through various loading conditions. For a given work machine travel speed selected by a machine operator, requested motor power increases as output torque increases. Likewise, for the same given speed, as output torque decreases, requested motor power also decreases.

Requested motor power, as in step 100, may be determined as a function of a rotational speed and torque or command torque of motor 22. It is contemplated that requested motor power may also be determined as a function of actual voltage and commanded current, or in many other ways known in the art. Output of motor 22 may be controlled from a closed loop speed command or torque command system (not shown). This closed loop system may function by either issuing a motor output speed command or a motor output torque command to motor 22 that results in the appropriate operator selected work machine travel speed.

Two methods of determining requested motor power as a function of motor speed and torque are described in Eq. 1 and Eq. 2 below:

Requested Motor Power=Actual Motor Speed*Motor Torque Command    Eq. 1:

Requested Motor Power=Actual Motor Speed*Actual Motor Torque    Eq. 2:

It is also contemplated that neither speed nor torque information may be used to determine requested motor power, but instead, a motor voltage and current may be used according to Eq. 3 and Eq. 4 listed below:

Requested Motor Power=Monitored Motor Voltage*Monitored Motor Current  Eq. 3:

Requested Motor Power=Monitored Motor Voltage*Commanded Motor Current  Eq. 4:

Voltage levels of common bus 20 may also affect operation of generator 18. As described above, capacitor 24 may have a desired voltage range. If a voltage level of common bus 20, which is connected to capacitor 24, falls below or rises above the desired voltage range, a closed loop algorithm may be implemented to increase or decrease the voltage level across common bus 20 (step 140). In doing so, an actual voltage level measured by voltage sensor 68 may first be compared with the desired voltage of capacitor 24 (step 130). If the voltage level of common bus 20 is outside of the desired voltage range, a requested bus power value calculated as a function of error between actual bus voltage and desired bus voltage may be added to the requested motor power, determined from Eq. 1–4 above (step 120).

Power efficiencies of electric motors may vary as a speed, torque, temperature, and other operating variables of the motor vary. In order to compensate for this effect, an offset factor may be implemented. Motor variables may be compared with an efficiency offset map stored within the memory of controller 30 to determine an offset factor that corresponds with the motor speed (step 110). This offset factor may then be used to offset the sum of requested motor and bus power to determine a requested generator power that accommodates the motor and bus power needs.

Generator 18 may be operated to produce the requested generator power by issuing a torque command to generator 18. The torque commanded from generator 18 may be dependent upon generator speed and the requested generator power determined in step 120 above, and may be determined according to Eq. 5 below (step 150):

Eq. 5:

$$\text{Generator Torque Command} = \frac{\text{Requested Generator Power}}{\text{Actual Generator Speed}}$$

Figure 5:
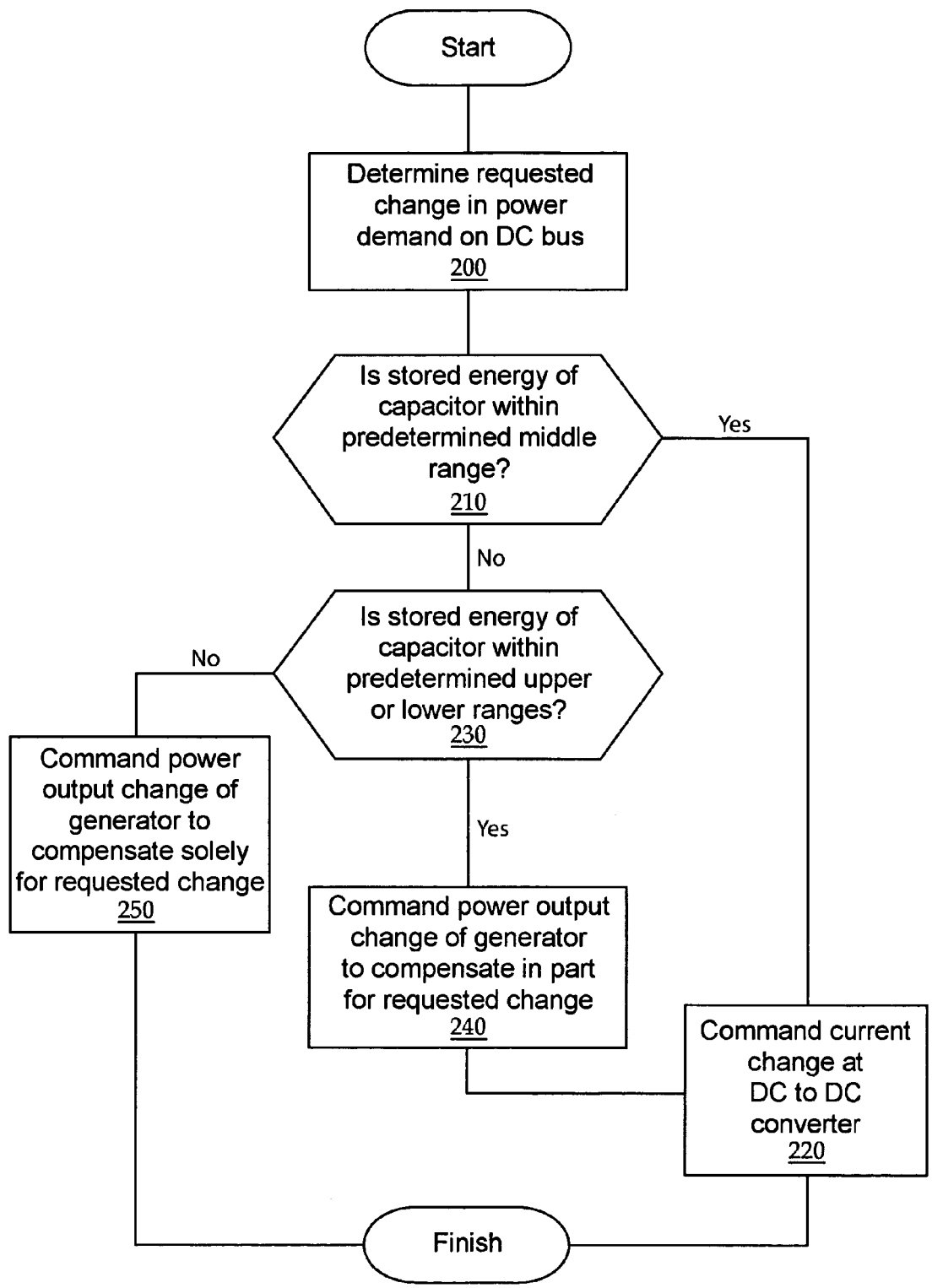
FIG. 5 is a flow chart showing operation of a control algorithm according to an exemplary disclosed embodiment.

Referring to FIG. 5, and also with reference to FIG. 4, there is shown a flow chart illustrating an exemplary control scheme whereby a controller such as controller 30 of FIG. 4 can compensate for changes in power demand on DC bus 20 in electric drive system 14. In general, the voltage of DC bus 20 will inherently increase if power is fed therein, and will decrease as power is extracted. Controller 30 is operable to partition power flow to and from DC bus 20 among generator 18, energy storage device or capacitor 24, and motor 22 according to a variety of system operating parameters, as described herein. Actual power demand to motor 22 from DC bus 20 is related to a torque on motor 22 commanded by the machine operator, which ultimately draws a given motor power from DC bus 20. To balance the power flow into and out of DC bus 20, controller 30 is operable to command a torque of generator 18, and operable to command a positive or negative current at DC to DC converter 25. The commanded power to or from capacitor 24 is calculated, for example by controller 30, by multiplying the commanded DC to DC converter current by the present voltage of DC bus 20. In a typical design, the commanded power to DC bus 20 from generator 18 is the present generator speed times the commanded torque, whereas the commanded power to motor 22 is the present motor speed times the commanded torque.

In a preferred embodiment, controller 30 is incorporated with an article having a computer readable medium with a control algorithm recorded thereon. It should be appreciated that the term "computer readable medium" is intended to encompass a wide variety of media, including RAM, ROM, hard drives, etc. In a preferred embodiment, the control algorithm facilitates partitioning of compensation for changes in power demand on DC bus 20 among the various system components. Partitioning of the power demand on DC bus 20, or the load, is preferably based at least in part on the quantity of energy stored in capacitor 24. Other factors may also affect the distribution of power draw and supply, including but not limited to engine emissions, operating temperatures, SOC, capability limits, component speeds and rate limits. Controller 30 is preferably configured to monitor a variety of system operating parameters, and commands/monitors factors such as generator speed and torque, motor speed and torque, the quantity of energy stored in capacitor 24, and current magnitude and/or voltage change of the DC to DC converter. Various rate limits relating to changes in operation of the various system components may also be monitored, either directly or indirectly, including rates of increase or decrease in the foregoing factors. It is generally desirable to maintain the voltage of DC bus 20 at a substantially constant level, or at least within some predetermined range. Accordingly, controller 30 will continuously or repetitively monitor the bus voltage and adjust the power flow into or out of DC bus 20 from generator 18, motor 22 and capacitor 24 to maintain the voltage at the desired level or within a desired voltage range.

The control algorithm recorded on the article incorporated with controller 30 includes means for compensating for a change in power demand on DC bus 20. The means for compensating further includes means for commanding a current change at DC to DC converter 25, such that a change in power demand is primarily compensated for by capacitor 24 rather than generator 18, if a stored energy of capacitor 24 is within a predetermined middle range. Most preferably, changes in power demand are compensated for solely by capacitor 24, if the quantity of stored energy therein is within the predetermined middle range. This operating scheme is preferred because it is desirable to operate generator 18 in a steady state, or at least a state of relatively constant increase or decrease in torque or speed. It is generally understood in the art that avoiding rapid changes in generator operation can optimize certain aspects of an electric drive system's operation, for example, emissions control. Thus, as work machine 10 operates, capacitor 24 will function as the primary supply or sink for power changes on DC bus 20, so long as capacitor 24 has a quantity of stored energy within the stated middle range. Where electric drive system 14 of work machine 10 encounters spikes, or "transients," in power demand or supply to DC bus 20, generator 18 can be maintained at a steady state, or a rate of change in generator torque or speed can be substantially maintained while compensating for the change primarily or solely with capacitor 24.

As used herein, the term "middle range" should be understood to refer to a less than full range of stored energy in capacitor 24 between a fully discharged and a fully charged state. The exact middle range of energy storage will vary depending upon the application, storage specifications and, particularly, the relative magnitude of the anticipated changes in power demand on DC bus 20. For example, certain applications such as electric drive work machines contemplated to experience relatively frequent, low level power draw changes may be best suited to a narrower middle range than electric drive work machines wherein only relatively large, occasional changes in power draw are expected. In any event, those skilled in the art will appreciate that the selected boundaries of the middle range, as further described herein, may vary substantially in different drive systems, and even within the same system, which might be programmed differently for different operating environments. In one specific example, the middle range may be 30–70% capacity of capacitor 24.

Thus, in the control scheme set forth in FIG. 5, a requested change in power demand on DC bus 20 is initially determined, as in step 200. Simultaneously, or subsequently, controller 30 determines the quantity of stored energy in capacitor 24 (steps 210 and 230). If the quantity of stored energy in capacitor 24 is within the described middle range, then the change in power demand will preferably be compensated for solely by capacitor 24, as in step 220. The control process of FIG. 5 is preferably repeated throughout the course of work machine operation. Thus, those skilled in the art will appreciate that an initial change in power demand on DC bus 20 could be compensated for solely by capacitor 24. If the changed power demand persists, however, capacitor 24 may eventually discharge or absorb enough power that its quantity of stored energy will fall below or rise above the middle range. In such a case, the power change compensation will also involve generator 18 as further described herein.

In general, the load on DC bus 20 will be the requested motor power along with any efficiency losses in system 14, and associated components. The number and type of capacitor, and definition of its middle range can be selected on this basis, such that any anticipated requested motor power can be compensated for, at least initially, solely by capacitor 24. Alternatively, limits might be built into the system such that when the stored capacitor energy is in the middle range, only that quantity of power available may be supplied to the DC bus.

Where the quantity of stored energy in capacitor 24 is not within the middle range, but is instead within one of an upper or lower range, each contiguous with the middle range, controller 30 will preferably command a change in power output of generator 18, as in step 240. The lower, middle and higher ranges could be 10–30%, 30–70%, and 70–90%, respectively. For example, if capacitor 24 has a stored energy quantity in the lower range, the controller 30 will both command an increase in power output of generator 18 and a current increase or voltage increase at DC to DC converter 25. If the quantity of stored energy in capacitor 24 is below the lower range, generator 18 is preferably commanded to compensate for the entire change in power demand on DC bus 20, as in step 250.

Where the change in power demand is a decrease in power demand, for example, where work machine 10 is braked, and motor 22 acts as a generator, a current change command is preferably sent to DC to DC converter 25. If the stored energy of capacitor 24 is within the middle range, capacitor 24 will serve as the sole means of compensating for the change, at least initially absorbing all of the power to DC bus 20 from motor 22. If, instead, the stored energy of capacitor 24 is within an upper range, generator 18 can be commanded to adjust its power output to also absorb a portion of the power supplied to DC bus 20 from motor 22. Where the stored energy of capacitor 24 is above the upper range, generator 18 can act as the primary or sole means of compensating for the change in power demand in DC bus 20. Further embodiments are contemplated wherein a portion of excess power is dissipated by resistive grid circuit 28, or a similar device.

The control algorithm further preferably includes means for returning the stored energy of capacitor 24 toward a target quantity of stored energy. Most preferably, a current change and/or a voltage change command is sent to DC to DC converter 25 to allow current to flow between capacitor 24 and DC bus 20. Generator 18 may be commanded to increase its power output, or commanded to decrease its power output, adjusting the stored energy of capacitor 24 as needed. Similarly, capacitor 24 may supply or absorb power to DC bus 20, which supplies or absorbs the same utilizing motor 22.

As it is generally desirable to minimize changes in generator power output, and/or minimize the rate of change in generator power output, discharging or charging of capacitor 24 toward its target energy quantity can take place by blending the power flow between generator 18 and motor 22. In other words, the power flow into or out of capacitor 24 to adjust the stored energy content thereof can take place by partitioning the power flow to or from capacitor 24 in such a way that changes in operation of generator 18, or the relative rate of such changes, are minimized.

In a preferred embodiment, the "target quantity" of stored energy will typically lie at a selected point within the middle range. In most applications, placing the target quantity within the middle range will allow capacitor 24 the greatest flexibility in compensating for changes in power demand. The exact selection of the target quantity will depend, however, on various considerations. For example, in an application where power flow to DC bus 20 from motor 22 is rare or nonexistent, there will typically be a reduced need for capacitor 24 to absorb power from DC bus 20, and its function will be primarily to provide additional power to DC bus 20 as needed. Such an application might be best suited to a target quantity corresponding to a relatively greater quantity of energy stored in capacitor 24. Similarly, in an application wherein power flow to DC bus 20 from motor 22 is relatively frequent, or of a relatively great magnitude, a relatively lower target quantity of capacitor 24 might be selected.

The present description is for illustrative purposes only, and should not be construed to narrow the breadth of the claims set forth below in any fashion. Thus, it will be apparent to those skilled in the art that various modifications and variations can be made to the electric drive system, control system and processes described herein. For example, while controller 30 is preferably programmed with an algorithm partitioning power flow based in part on middle, upper and lower energy storage levels of capacitor 24, other configurations are possible. Rather than a predetermined upper range, the "middle range" might be inclusive of the uppermost energy storage level of capacitor 24, for instance in applications where relatively larger quantities of power are desired to be available from capacitor 24, yet the energy absorption capacity thereof is less critical. Other embodiments will be apparent to those skilled in the art from consideration of the specification and practice of the disclosed electric drive system. Other aspects, features and advantages will be apparent upon an examination of the attached Figures and appended claims.

What is claimed is:

1. A controller for an electric drive system in a work machine comprising an article that includes a computer readable medium having a control algorithm recorded thereon;

said controller being configured via said control algorithm to compensate for a change in requested power demand on a DC bus of the electric drive system having an electric motor and a generator separate from the electric motor connected therewith, wherein said controller includes:

means for determining a change in requested power demand on said DC bus; and means for compensating for the change in requested power demand via at least one of the generator and an energy storage device, including means for commanding a current change at a DC to DC converter coupling the energy storage device with said DC bus and means for commanding a power output change of said generator;

said means for compensating further including means for compensating for the change in power demand primarily via the energy storage device rather than the generator, if a stored energy of said energy storage device is within a predetermined middle range.

2. The controller of claim 1 wherein said controller further comprises means for determining whether a stored energy of said energy storage device is within said predetermined middle range, an upper range or a lower range, and wherein said means for compensating includes means for compensating for a change in motor loading on said DC bus via commanding a current change at said DC to DC converter where the stored energy is within said middle, upper or lower range.

3. The controller of claim 2 wherein said means for compensating includes means for commanding a change in power output of said generator to said DC bus such that the change in power demand is compensated for at least partially by said generator, if the stored energy of said energy storage device is outside of said predetermined middle range.

4. The controller of claim 3 wherein said means for compensating includes means for commanding a change in power output of said generator to said DC bus such that the change in power demand is compensated for in part by said generator and in part by said energy storage device, if the stored energy of said energy storage device is outside of said predetermined middle range but within the predetermined upper or lower ranges.

5. The controller of claim 4 wherein said energy storage device comprises a capacitor, and wherein said means for commanding further includes means for sending commands for at least one of said capacitor and said generator simultaneous with determining a change in requested power demand on said DC bus based on the change in motor loading.

6. The controller of claim 5 wherein said means for compensating includes means for commanding increasing a power output of said generator to said DC bus, if the stored energy of said energy storage device is within or below said predetermined lower range.

7. The controller of claim 6 wherein said means for compensating includes means for commanding decreasing a power output of said generator to said DC bus, if the stored energy of said energy storage device is within or above said predetermined upper range.

8. The controller of claim 4 wherein said energy storage device comprises a capacitor, and wherein said controller further includes means for returning the stored energy of said energy storage device toward a target quantity of stored energy via at least one of the motor and the generator, if the stored energy of said energy storage device is outside the predetermined middle range, at least in part via commanding a current change at said DC to DC converter.

9. The controller of claim 8 wherein said means for returning includes means for commanding a generator output change and a current change at said DC to DC converter to drive the stored energy of the energy storage device toward said predetermined middle range.

10. The controller of claim 9 wherein said means for returning includes means for commanding a current change at said DC to DC converter to lower a quantity of stored energy of said energy storage device, if the stored energy of said energy storage device is above said predetermined middle range.

11. The controller of claim 9 wherein said means for returning includes means for selectively commanding a decrease in power output of said generator to offset in said DC bus at least a portion of stored energy discharged to said DC bus by said energy storage device.

12. An electric drive system for a work machine comprising:

a DC bus;

an energy storage device configured to supply power to and absorb power from said DC bus;

a generator configured to supply power to and absorb power from said DC bus;

a motor separate from said generator and configured to supply power to and absorb power from said DC bus;

a DC to DC converter coupling said energy storage device with said DC bus;

an electronic control module operable to control a voltage of said DC bus, said electronic control module including means for determining a quantity of stored energy of said energy storage device, means for determining a requested change in power demand on the DC bus, and means for compensating for the change in requested power demand on said DC bus, said means for compensating including means for commanding a current at said DC to DC converter, and means for commanding a power output of said generator;

said electronic control module further being operable via said means for compensating to partition a power flow among said generator, said motor and said energy storage device, at least in part via current commands to said DC to DC converter to control current flow into and out of said DC bus which are based at least in part on the determined quantity of stored energy of said energy storage device.

13. A method of controlling a power supply to a DC bus in an electric drive system having a generator and a motor separate from the generator coupled with the DC bus, said method comprising the step of:

determining a quantity of stored energy of an energy storage device coupled with the DC bus;

determining a requested change in power demand on the DC bus based on a change in motor loading on the DC bus; and compensating for the requested change in power demand on the DC bus at least in part with the energy storage device by commanding a current flow at a DC to DC converter coupling the energy storage device with the DC bus, if a stored energy of the energy storage device is within a predetermined middle range.

14. The method of claim 13 wherein the step of compensating for the change in power demand on the DC bus comprises:

compensating for the change in power demand at least in part with the generator, including commanding a power output of the generator based on the determined quantity of stored energy of the energy storage device.

15. The method of claim 13 wherein:

the step of determining a quantity of stored energy of the energy storage device further comprises determining whether the quantity of stored energy is within the predetermined middle ranges, a predetermined upper range, or a predetermined lower range;

the step of compensating for the change in power demand on the DC bus further comprises:

compensating for the change in power demand on the DC bus primarily with the energy storage device, if the quantity of stored energy is within the predetermined middle range, and compensating for the change in power demand on the DC bus at least in part with the generator, if the stored energy of the energy storage device is outside of the predetermined middle range.

16. The method of claim 13 wherein the step of compensating for the change in power demand on the DC bus further comprises:

compensating for the change in power demand on the DC bus in part with the generator and in part with the energy storage device, if the stored energy of the energy storage device is outside of the predetermined middle range but within one of a predetermined upper or lower range.

17. The method of claim 16 wherein the step of compensating for the change in power demand on the DC bus further comprises:

compensating for the change in power demand solely with the generator, if the stored energy of the energy storage device is outside of the predetermined middle, upper and lower ranges.

18. The method of claim 17 wherein the energy storage device comprises a capacitor, the method further comprising the step of:

returning the stored energy of the energy storage device toward a target quantity of stored energy at least in part by commanding a current flow at the DC to DC converter, if the stored energy of the energy storage device is outside the predetermined middle range.

19. The method of claim 18 wherein the step of returning the stored energy of the energy storage device toward a target quantity comprises adjusting the power output or rate of change in the power output of the generator, if the stored energy of the energy storage device is outside the predetermined middle range.

* * * * *